United States Patent
Watanabe

(10) Patent No.: US 6,996,425 B2
(45) Date of Patent: Feb. 7, 2006

(54) CELLULAR PHONE HOUSING

(75) Inventor: Yohsuke Watanabe, Tokyo (JP)

(73) Assignee: NEC Corporation, (JP)

(*) Notice: Subject to any disclaimer, the term of this patent is extended or adjusted under 35 U.S.C. 154(b) by 665 days.

(21) Appl. No.: 10/011,032

(22) Filed: Nov. 13, 2001

(65) Prior Publication Data

US 2002/0072335 A1 Jun. 13, 2002

(30) Foreign Application Priority Data

Nov. 16, 2000 (JP) .............................. 2000-350242

(51) Int. Cl.
 H04M 1/00 (2006.01)
(52) U.S. Cl. ............. 455/575.1; 455/90.3; 379/433.01; 379/433.13; 427/250; 427/302; 427/304; 427/305
(58) Field of Classification Search ............... 455/90.3, 455/575.1, 575.3, 575.8, 575.5; 379/433.01, 379/433.13; 427/250–253, 302, 304–306
See application file for complete search history.

(56) References Cited

U.S. PATENT DOCUMENTS

| | | | |
|---|---|---|---|
| 5,374,779 A | | 12/1994 | Konishi |
| 5,541,813 A | * | 7/1996 | Satoh et al. ................. 361/752 |
| 5,837,086 A | * | 11/1998 | Leeb et al. .................. 156/245 |
| 5,925,847 A | * | 7/1999 | Rademacher et al. ..... 174/35 R |
| 6,331,239 B1 | * | 12/2001 | Shirota et al. .............. 205/167 |
| 6,341,415 B2 | * | 1/2002 | Amemiya et al. ....... 29/603.06 |
| 6,344,977 B1 | * | 2/2002 | Takagi ........................ 361/814 |

FOREIGN PATENT DOCUMENTS

| | | |
|---|---|---|
| CN | 1211587 | 3/1999 |
| CN | 1236250 | 11/1999 |
| EP | 0-597 670 | 11/1993 |
| EP | 1 187 430 | 3/2002 |
| JP | 62-500344 | 2/1987 |
| JP | 2-115390 | 4/1990 |
| JP | 2-175895 | 7/1990 |
| JP | 3-270099 | 12/1991 |
| JP | EP 0 597670 A1 * | 5/1994 |
| JP | EP 0597670 A1 * | 5/1994 |
| JP | 7-323795 | 12/1995 |
| JP | 8-66970 | 3/1996 |
| JP | 8-134689 | 5/1996 |

(Continued)

OTHER PUBLICATIONS

Japanese Office Action issued Apr. 8, 2003 (w/ English translation of relevant portion).

(Continued)

*Primary Examiner*—Temica Beamer
*Assistant Examiner*—Anthony S. Addy
(74) *Attorney, Agent, or Firm*—Dickstein, Shapiro, Morin & Oshinsky, LLP.

(57) ABSTRACT

There is provided a cellular phone housing formed with a base made of a resin material by molding, wherein the base is coated with a metal multilayer including a lower metal layer formed on a surface of the base with metal plating and an upper metal layer formed on the lower metal layer with metal plating, and wherein the lower metal layer is made of a first metal which is ductile and the upper metal layer is made of a second metal which is brittle compared with that of the first metal.

11 Claims, 3 Drawing Sheets

FOREIGN PATENT DOCUMENTS

| | | |
|---|---|---|
| JP | 9-13194 | 1/1997 |
| JP | 11-222698 | 8/1999 |
| JP | 11-277648 | 10/1999 |
| JP | 2000-212759 | 8/2000 |
| JP | 2000-212760 | 8/2000 |
| WO | WO 00/52982 | 9/2000 |

OTHER PUBLICATIONS

Chinese Office Action issued May 30, 2003 (w/ English translation).

UK Patent Search Reported dated Aug. 6, 2002.

* cited by examiner

CELLULAR PHONE HOUSING

BACKGROUND OF THE INVENTION

1. Field of the Invention

The invention relates to a cellular phone housing which is inexpensive to manufacture and also which has high rigidity, static strength, and shock resistance even with a small thickness thereof.

The present application claims priority of Japanese Patent Application No. 2000-350242 filed on Nov. 16, 2000, which is hereby incorporated by reference.

2. Description of the Related Art

With prevalence of cellular phones in recent years, there have been more and more desires for reducing size and weight thereof. To further reduce the size and weight of the cellular phones, many methods have been developed to reduce a thickness of a housing of those cellular phones, which is, however, accompanied by a problematical decrease in rigidity and shock resistance of the housing.

To enhance the rigidity of the housing, such a method is employed by some manufactures as to use as a material of the housing, for example, a reinforced resin material filled with glass fiber or carbon fiber.

If the reinforced resin material containing such the filler is used, however, the filler has an adverse effect on a fluidity of the resin during molding, thus making it difficult to make the housing structure thin and more complicated design shapes are difficult to mold, which is a problem.

Also, a display screen is desired to be larger as more and more e-mails are being transmitted and received between cellular phones and more and more home pages are utilized thereon recently. To accommodate such a large-sized screen, a folding construction has been employed, which is however accompanied by a problem of a deteriorated strength of a hinge for connecting an upper-side housing portion and a lower-side housing portion with each other.

To solve this problem, one method is used to make the housing by die-cast metal molding so that the hinge may be kept to be strong even with a thin and light body of the housing.

The die-cast metal molded housing, however, is deteriorated in moldability if it is thin; and also burrs generated during molding thereof must be removed, which causes another problem of a deteriorated productivity, a higher cost, and a like. Further, the die-cast metal molded housing has high rigidity, so that the housing, if a relevant cellular phone is dropped, cannot absorb a shock, which is directly loaded on an internal printed board or electric elements, thus leading to a problem of increased damage to electric connections.

Thus, the prior art cellular phone housing, if it is made of a reinforced resin material containing a filler for a smaller and lighter construction, is difficult to make thin and mold into a complicated design shape, and if it is die-cast metal molded in construction in order to increase the strength of a hinge of the holding housing, accompanied processes of molding it into a thin construction and removing the burrs inevitably leads to a problem of deteriorated productivity and increased manufacturing costs; further, such the housing has a poor shock absorptive characteristic and so suffers from a problem that a shock, when it is dropped, may affect the internal board and the connections of the elements or a like.

SUMMARY OF THE INVENTION

In view of the above, it is an object of the invention to provide a cellular phone housing which is inexpensive to manufacture and also which has high rigidity, static strength, and shock resistance even with a small thickness thereof.

According to an aspect of the present invention, there is provided a cellular phone housing formed with a base made of a resin material by molding, wherein the base is coated with a metal multilayer including a lower metal layer formed on a surface of the base with metal plating and an upper metal layer formed on the lower metal layer with metal plating, and wherein the lower metal layer is made of a first metal which is ductile and the upper metal layer is made of a second metal which is brittle compared with that of the first metal.

In the foregoing, a preferable mode is one that wherein includes an upper-side housing portion and a lower-side housing portion connected to each other by a hinge, hereby capable of folding the upper-side housing portion and the lower-side housing portion each other; and the metal multilayer is formed on either one or both of the upper-side housing portion and the lower-side housing portion.

Also, a preferable mode is one wherein the upper-side housing portion and the lower-side housing portion are made of a top cover and a bottom cover respectively; and the metal multilayer is formed on either one or both of the top cover and the bottom cover.

Also, a preferable mode is one wherein the metal multilayer is formed on either one or both of the top cover and the bottom cover.

Also, a preferable mode is one wherein the resin material is made of a poly-carbonate resin or an ABS (Acrylonitrile Butadiene Styrene) resin.

Also, a preferable mode is one wherein the lower metal layer is made of copper (Cu) and the upper metal layer is made of nickel (Ni).

Also, a preferable mode is one wherein a ratio in thickness between the lower metal layer and the upper layer is from 4:1 to 5:1.

Also, a preferable mode is one wherein the lower metal layer includes a first copper layer formed on the surface of the base with chemical plating and a second copper layer formed on the first copper layer with electroplating.

With the above configurations, the resin-made base on which the cellular phone housing is mounted is provided with a metal multilayer so that each of thicknesses of the lower metal layer and the upper metal layer can be adjusted to improve rigidity and static strength of the housing made of this thin resin-made base and add a high shock resistance to the housing.

Thus, in contrast to the prior art of using a reinforced resin material containing a glass fiber or a carbon fiber, the invention can use an ordinary resin material having a better moldability to improve rigidity, static strength, and shock resistance of the cellular phone housing, thus reducing thickness of the housing, thus providing a small-sized and light-weighted cellular phone. Also, as compared to a case of using a die cast metal, the invention can improve the strength of especially the hinge of a foldable housing, thus improving the productivity and also providing an appropriate level of rigidity to such an extent that a drop shock can be absorbed.

BRIEF DESCRIPTION OF THE DRAWINGS

The above and other objects, advantages, and features of the present invention will be more apparent from the following description taken in conjunction with the accompanying drawings in which.

DESCRIPTION OF THE PREFERRED EMBODIMENT

The following will describe embodiment of the invention with reference to the drawings. The description is made specifically with reference to the embodiment.

Figure 1:
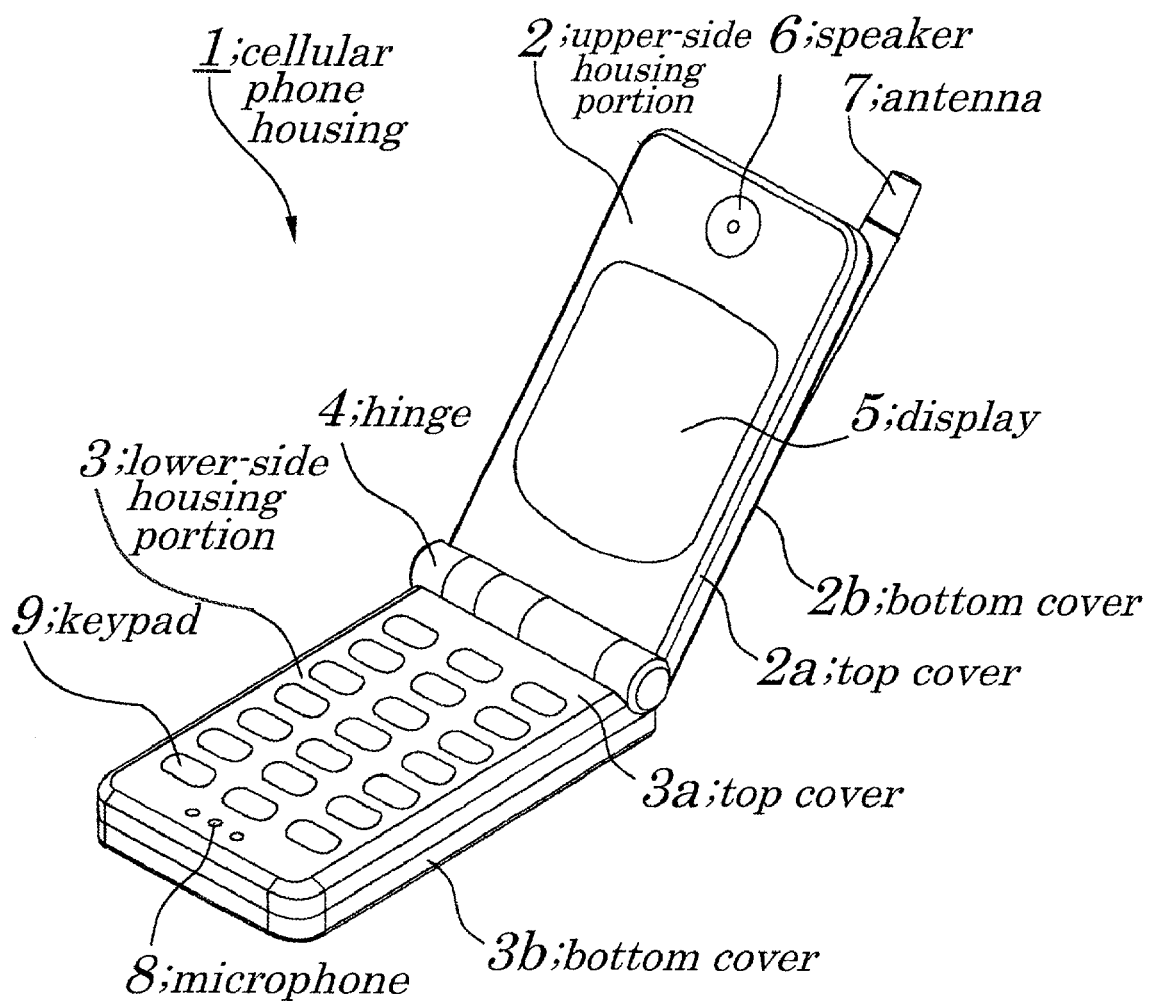
FIG. 1 is an external perspective view for showing a configuration of a cellular phone housing according to an embodiment of the present invention.

As shown in FIG. 1, a cellular phone housing 1 of the embodiment mainly includes an upper-side housing portion 2, a lower-side housing portion 3 and a hinge 4, and is provided with a display 5, a speaker 6, an antenna 7, a microphone 8, and a keypad 9.

The upper-side housing portion 2 is made up of a top cover 2a and a bottom cover 2b to house electric circuits and wires therebetween and also the display 5 for displaying characters and various graphics and the speaker 6 for transducing electric energy into voice energy on the front and the antenna 7 on the back for transmitting and receiving a radio wave. The lower-side housing portion 3 is made up of a top cover 3a and a bottom cover 3b to house therebetween a printed board on which are formed electric circuits necessary for operations of the cellular phone and also the mircophone 8 for entering a transmit voice and the keypad 9 for key input operations and various control operations. The hinge 4 connects the upper-side housing 2 and the lower-side housing portion 3 in a foldable manner.

The cellular phone housing 1 of this embodiment has a base 11 made of a molded product formed by injection-molding a resin material and a metal multilayer formed on this base 11 partially or completely with plating.

Figure 2:
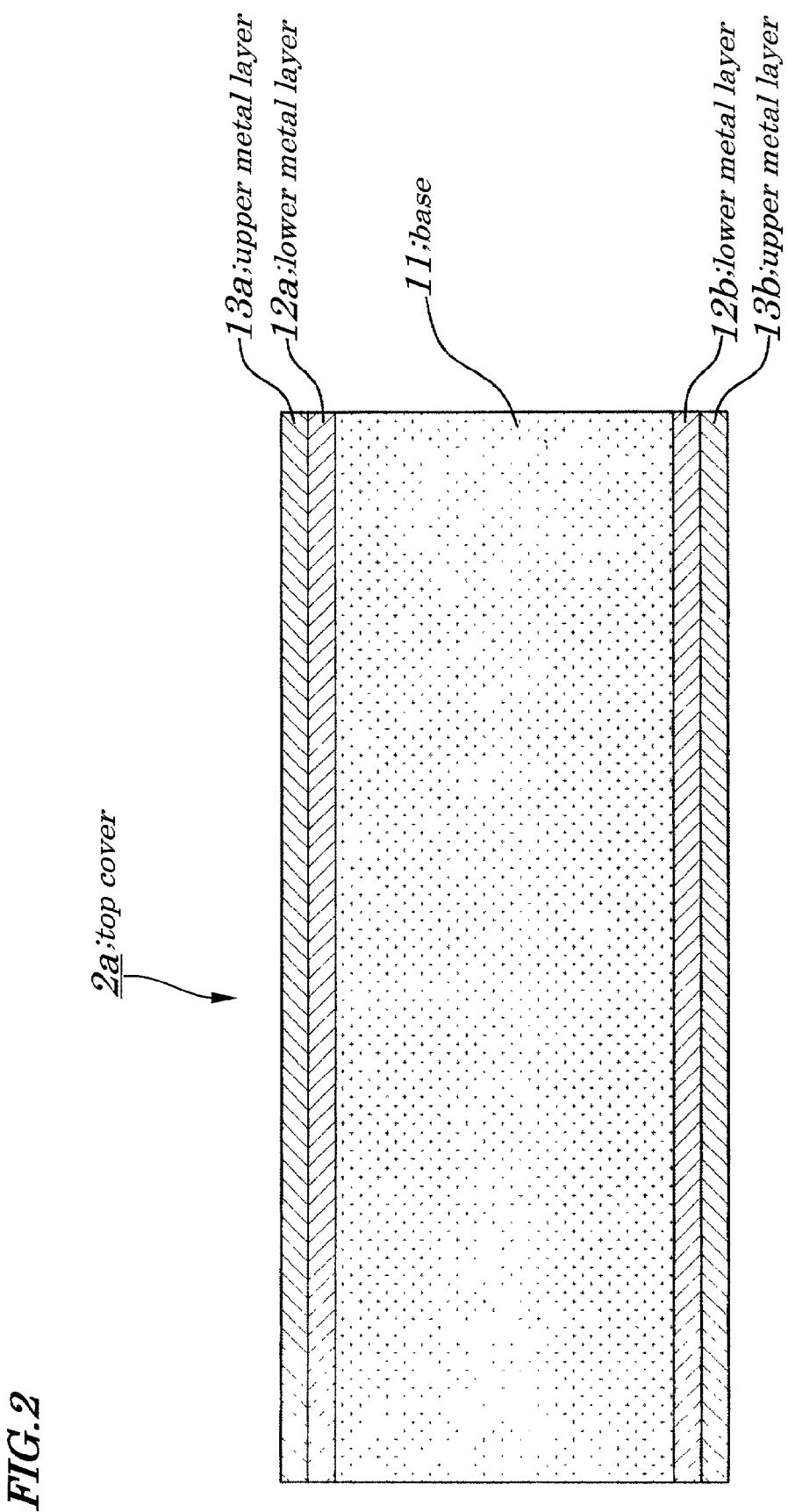
FIG. 2 is a cross-sectional view for showing a cross-sectional construction of a top cover of a lower-side housing portion of the cellular phone housing of the embodiment.

The following will describe a cross-sectional construction of a housing member making up the top cover 2a of the lower-side housing portion 3 in the cellular phone housing 1 as one example of features of such a cellular phone housing 1, with reference to FIG. 2.

As shown in FIG. 2, the top cover 2a is provided with a base 11 made of a resin material, a lower first metal layers 12a and 12b coated, and an upper metal layers 13a and 13b, which are coated on both surfaces of the base 11 respectively.

Figure 3:
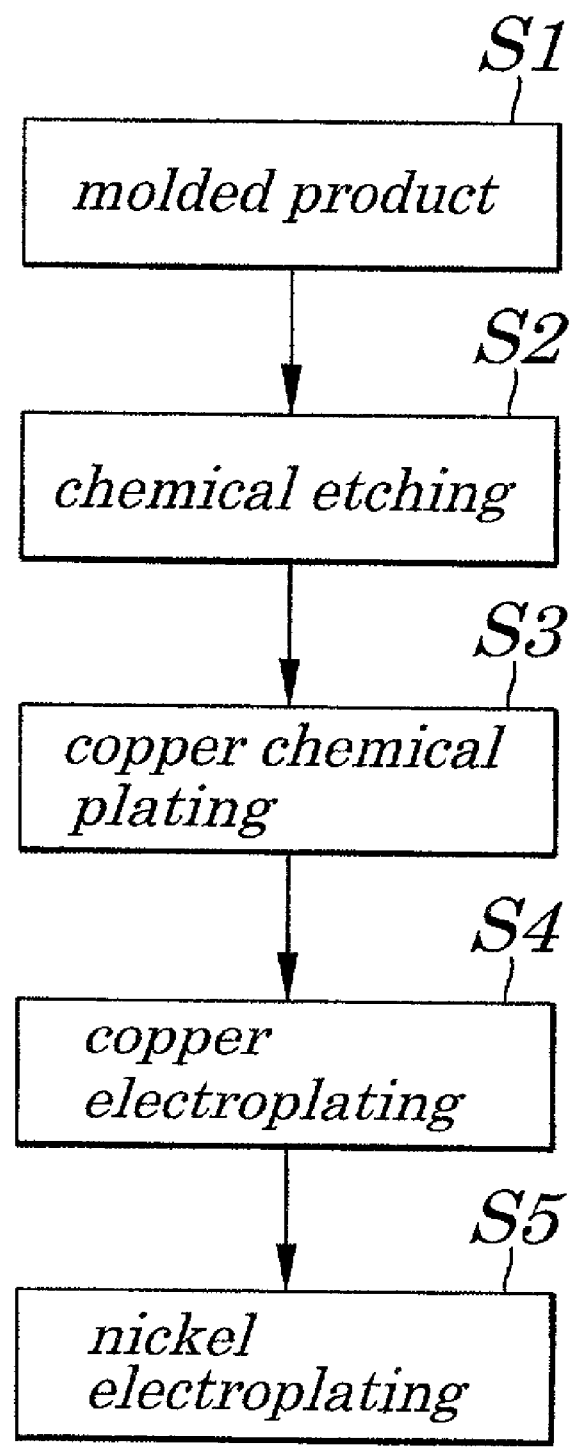
FIG. 3 is a flowchart for showing an example of plating steps for the cellular phone housing of the embodiment.

The following will describe how to form these metal layers 12a, 12b, 13a, and 13b in this construction of the embodiment, with reference to FIG. 3.

Of various methods available for forming metal layers 12a, 12b, 13a, and 13b, this embodiment employs a typical electroplating method.

First, the base 11 of a predefined shape is formed as a molded product by injection-molding such a resin material as a poly-carbonate resin (step S1 in FIG. 3).

Next, both surfaces of the member (molded product) thus obtained by this injection molding are roughened by chemical etching (step S2 in FIG. 3).

Next, first copper (Cu) layers (not shown) are formed on the surfaces of the molded product with chemical plating (step S3 in FIG. 3) and then second copper (Cu) layers (not shown) are formed on the first copper (Cu) layers with electroplating (step S4 in FIG. 3). Thus, the lower metal layers 12a, 12b are respectively made up of the first copper layer and the second copper.

Next, nickel (Ni) layers are formed on the lower metal layers 12a, 12b with electroplating (step S5 in FIG. 3). Thus, the upper metal layers 13a, 13b are respectively made up of nickel (Ni) layers.

The metal multilayer is made up of the lower metal layer 12a (12b) and the upper metal layer 13a (13b). The thickness of the metal multilayer formed on the base 11 is preferably 10 $\mu$m or so as a whole, considering weight of a metal die-cast molded product.

This method of double-plating, in which copper and nickel are used as plating materials, aims at making it difficult for metal deposits to flake off by giving the highly-ductile copper metal layer as the lower metal layer 12a (12b) and also, by giving the nickel metal layer as the upper metal layer 13a (13b), it does aim at keeping a mechanical strength as well as preventing oxidation of the copper metal layer as the lower metal layer 12a (12b), in which a ratio in thickness between the copper metal layer as the lower metal layer 12a (12b) and the nickel metal layer as the upper metal layer 13a (13b) is 2:1 or so by a typical double plating method.

A cellular phone, however, is required to have a shock resistance in case it is dropped when in use, so that the cellular phone housing 1 of this embodiment makes the copper metal layer (the lower metal layer 12a (12b)) thicker to sufficiently utilize the ductility of copper and makes the nickel metal layer (the upper metal layer 13a (13b)) thinner, which material is brittle and inferior to copper in shock resistance, thus further improving shock resistance. The inventor of the invention found that the most preferable ratio in film thickness between the copper metal layer (the lower metal layer 12a (12b)) and the nickel metal layer (the upper metal layer 13a (13b)) is about 4:1 to 5:1. If the copper metal layer (the lower metal layer 12a (13b)) is made thinner, the cellular phone housing 1 is deteriorated in shock resistance and if the nickel metal layer (the upper metal layer 13a (13b)) is made thinner, on the other hand, the cellular phone housing 1 is deteriorated in rigidity and static strength, neither of which is preferable.

The thickness of the metal layers of the invention can be easily controlled by adjusting a time for which the cellular phone housing 1 is plated with copper and nickel.

It should be noted that the nickel metal layer (the upper metal layer 13a (13b)) is indispensable from a viewpoint of necessity to prevent the copper metal layer (the lower metal layer 12a (12b)) from being oxidized and also necessary from a viewpoint of a need to enhance a static strength of the cellular phone housing 1 because it is more effective than the copper metal layer (the lower metal layer 12a (12b)) in keeping a high strength against an external static load. Further, the cellular phone housing 1 of this embodiment has the nickel metal layer (the upper metal layer 13a (13b)) to thereby have almost the same strength of its hinge 4 as that obtained by a metal die-casting method.

Thus, it is possible to provide such the cellular phone housing 1 of this embodiment that has high rigidity and static strength as well as excellent shock resistance even with small thickness thereof by coating a resin-molded product of the cellular phone housing 1 with the lower metal layer 12a (12b) and the upper metal layer 13a (13b) by use of copper and nickel respectively as superposed one on the other.

It is apparent that the present invention is not limited to the above embodiments but may be changed and modified without departing from the scope and spirit of the invention. For example, the base 11 of the cellular phone housing 1 may be made of, in addition to poly-carbonate resins, an ABS (Acrylonitrile Butadiene Styrene) resin or any other resins as far as they are good in moldability and platability and provide a required mechanical strength. Also, although the embodiment plates only the top cover 3a of the lower-side housing portion 3, the invention is not limited thereto; for example, only the bottom cover 3b of the lower-side housing portion 3, only the top cover 3a of the lower-side housing portion 3, or both of the bottom covers 2b, 3b may be plated even or both of the lower-side housing portion 3 and the upper-side housing portion 2 may be plated. The hinge 4 connecting these two housing portions 2, 3 to each other in a foldable manner may be plated to effectively enhance the strength thereof. Also, the base 11 may be plated with a metal on both sides, either one of these sides, or only such a portion that requires a mechanical strength to some extent. Further, by plating the cellular phone housing 1 with a metal it is possible to improve performance of shielding the cellular phone from a radiated radio wave and also to reserve a ground terminal in order to eliminate a necessity to coat the cellular phone housing 1 with a conductive material or attach a shield plate for the same purposes, thus reducing the number of necessary manufacturing steps and manufacturing costs of the cellular phone housing 1. Also, the cellular phone housing 1 may be plated in any number, including two, of layers in construction. For example, in place of ordinary coating conducted on the metal layer (deposit), the nickel metal layer is further plated with chrome (Cr) to provide a three-layer construction.

What is claimed is:

1. A cellular phone housing formed with a base made of a resin material by molding, wherein said base is coated with a metal multilayer comprising a lower metal layer formed on a surface of said base with metal plating and an upper metal layer formed on said lower metal layer with metal plating, and wherein said lower metal layer is made of a first metal which is ductile and said upper metal layer is made of a second metal which is brittle compared with that of said first metal, wherein a ratio in thickness between said lower metal layer and said upper metal layer is from 4:1 to 5:1.

2. The cellular phone housing according to claim 1, comprising an upper-side housing portion and a lower-side housing portion connected to each other by a hinge, the hinge capable of folding said upper-side housing portion and said lower-side housing portion relative to each other; and said metal multilayer is formed on either one or both of said upper-side housing portion and said lower-side housing portion.

3. The cellular phone housing according to claim 2, wherein:

said upper-side housing portion and said lower-side housing portion are made of a top cover and a bottom cover respectively; and said metal multilayer is formed on either one or both of said top cover and said bottom cover.

4. The cellular phone housing according to claim 1, wherein said resin material comprises a poly-carbonate resin or an ABS (Acrylonitrile Butadiene Styrene) resin.

5. The cellular phone housing according to claim 1, wherein said lower metal layer is made of copper (Cu) and said upper metal layer is made of nickel (Ni).

6. A cellular phone housing formed with a base made of a resin material by molding, wherein said base is coated with a metal multilayer comprising a lower metal layer formed on a surface of said base with metal plating and an upper metal layer formed on said lower metal layer with metal plating, and wherein said lower metal layer is made of a first metal which is ductile and said upper metal layer is made of a second metal which is brittle compared with that of said first metal, wherein said lower metal layer comprises a first copper layer formed on said surface of said base with chemical plating and a second copper layer formed on said first copper layer with electroplating.

7. The cellular phone housing according to claim 6, comprising an upper-side housing portion and a lower-side housing portion connected to each other by a hinge, the hinge capable of folding said upper-side housing portion and said lower-side housing portion relative to each other; and said metal multilayer is formed on either one or both of said upper-side housing portion and said lower-side housing portion.

8. The cellular phone housing according to claim 7, wherein:

said upper-side housing portion and said lower-side housing portion are made of a top cover and a bottom cover respectively; and said metal multilayer is formed on either one or both of said top cover and said bottom cover.

9. The cellular phone housing according to claim 6, wherein said lower metal layer is made of copper (Cu) and said upper metal layer is made of nickel (Ni).

10. The cellular phone housing according to claim 6, wherein said resin material comprises a poly-carbonate resin or an ABS (Acrylonitrile Butadiene Styrene) resin.

11. The cellular phone housing according to claim 6, wherein a ratio in thickness between said lower metal layer and said upper metal layer is from 4:1 to 5:1.

* * * * *